April 24, 1962  J. F. BOGNER ETAL  3,031,309
OVEN FRESH CAKE AND METHOD OF MAKING THE SAME
Filed Nov. 4, 1960
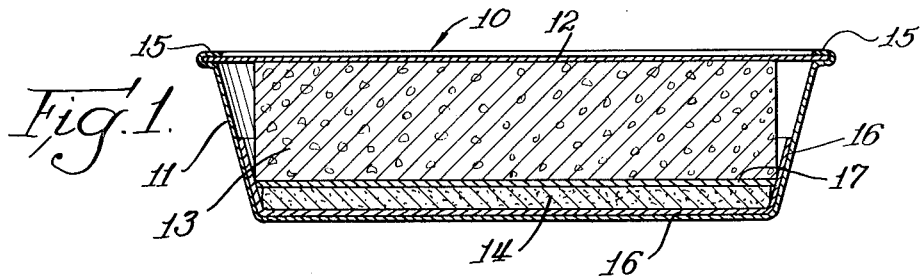
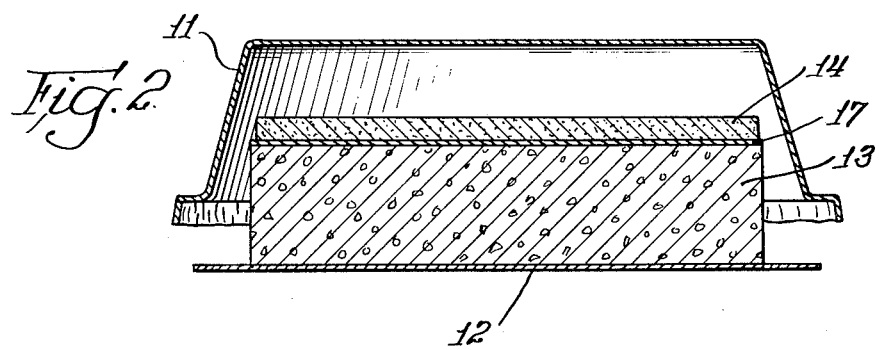
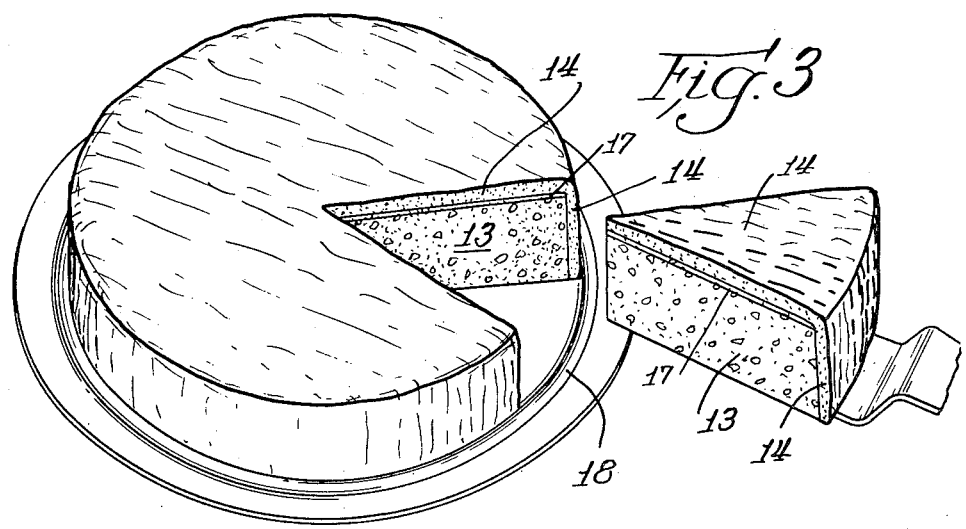
INVENTORS
Joseph F. Bogner
and Duard W. Enoch
By: Jones, Derby & Robertson Attys.

United States Patent Office

3,031,309
Patented Apr. 24, 1962

3,031,309
OVEN FRESH CAKE AND METHOD OF MAKING THE SAME
Joseph F. Bogner, Shawnee Mission, Kans., and Duard W. Enoch, Kansas City, Mo., assignors to Interstate Bakeries Corporation, Kansas City, Mo., a corporation of Delaware
Filed Nov. 4, 1960, Ser. No. 67,295
13 Claims. (Cl. 99—171)

This invention relates to a bakery product and more particularly to iced cakes made by a novel process of pre-baking a cake body and packaging it complete with an icing layer therefor so that the package can be warmed and the cake finished just prior to serving.

The novel process and packaging of the present invention contemplate an oven-fresh bakery product in which the entire package need only be placed in a warming oven for approximately ten minutes to produce, with final touching up of the icing if desired, an oven-fresh iced cake ready for serving as the end result. The packaged product comprises essentially a cake pan containing a layer of icing in the bottom thereof with an inverted pre-baked cake body in the pan above the icing layer, a suitable lid being provided so that when the lid is in place it forms, along with the pan, a protective package for the pre-baked cake body and icing layer, permitting shipment and display on shelves, for example, of a grocery store without injury to the contents of the package. A release coating may be provided on the inner surface of the pan, the coating being composed of a fatty substance or other suitable product which prevents sticking of the icing layer to the surface of the pan and permitting the oven-fresh iced cake to be readily removed from the pan by merely inverting the pan and permitting the cake to drop out freely or the pan to be removed from the cake.

An object of the present invention is to provide an oven-fresh bakery product with a minimum of preparation on the part of the consumer.

Another object of the invention is to provide a bakery product which can be conveniently assembled, shipped, and prepared in its own package, for final touching up of the icing after removal from the package and serving.

Other objects will be apparent to those skilled in the art and all of these objects are intended which fall within the scope of the appended claims.

The invention will be more fully understood from the following description taken in conjunction with the attached drawing in which:

FIG. 1 shows the product in cross-section;

FIG. 2 is similar to FIG. 1 except that the cake pan has been inverted and the oven-fresh cake is shown resting upon the lid; and FIG. 3 shows the iced cake after finishing on a serving plate, with a wedge of the finished cake being removed.

The product 10 as shown in FIG. 1 is composed of a cake pan 11 and a lid 12 therefor which constitute the protective package. The contents of the package will hereafter be referred to as a "cake preform" to distinguish the pre-baked cake body 13 and icing layer 14 in its initial form from the finished oven-fresh cake which is ready to be served. A pre-baked cake body 13 and an icing layer therefor 14 comprise the principal parts of the cake preform. The cake preform is conveniently packaged in a cake pan 11 of heavy aluminum foil or the like, the pan having a lid 12 of heavy cardboard or other suitable material. The lid may be crimped in place by the turned down sides of the cake pan 11 as at 15 to cover the cake preform and close the pan 11 to form a protective package for the cake preform.

A release coating 16 of a suitable fatty material is shown in FIG. 1 covering the inner surface of the bottom of the pan and the lower sides thereof upwardly from the bottom to prevent sticking of the icing layer 14 to the bottom or sides of the pan 11. Further, a moisture barrier 17, as shown in FIG. 1, the purpose of which will be hereinafter more fully described, is interposed between the pre-baked cake body 13 and the icing layer 14.

The lid 12 may have printed thereon instructions as to the proper preparation of the finished cake including, for example, directions for the warming and removal thereof from the pan.

Further, the lid 12 may also serve as a convenient work surface for the finishing of the cake after it has been warmed, so that upon finishing the oven-freshened cake it can be transferred to a serving plate 18 as shown in FIG. 3 from which the cake can be cut and served as desired.

For the purposes of the invention, the cake body 13 may be of any desired cake composition, flavor, color, size or shape, but, preferably, a cake body composition having freshable qualities is desired since the invention contemplates the pre-baking and cooling of the cake body prior to its being packaged. After packaging the cake body 13 may be required to stand for some period of time before the rewarming process is undertaken which oven-freshens the cake preform for serving, and therefore freshable qualities in the cake body 13 are desirable. The cake body batter is mixed and baked in the usual manner in a pan separate from the cake pan 11 in which it is packaged. This baking results in a completely baked cake body 13 which is then used, after having been cooled, in making the cake preform of the present invention.

The icing layer 14 to be used in preparing the cake preform is preferably of a composition of the fudge type or the like, containing a substantial proportion of a suitable fat to provide an icing which becomes spreadable when warm and which sets somewhat when cooled to room temperature.

A suitable material for the release coating 16 has been found to be a low melting semi-solid fat, such, for example, as coconut oil. However, other suitable materials may be used to release the icing from the pan. These might even be incorporated in the icing layer itself. The release coating composition of the present embodiment may be sprayed, brushed, or otherwise suitably applied to the inner surfaces of the cake pan 11 which are likely to be engaged by the icing layer 14. For example, the entire bottom of the inner surface of the cake pan 11 and the inner side surfaces thereof upwardly from the bottom of the pan should, at least to the thickness of the icing layer 14, have applied thereto the material of the release coating to prevent any sticking of the icing layer to the bottom or sides of the cake pan. Since the cake body 13 is pre-baked in a separate pan from the pan 11 in which the preform is packaged, it is not necessary to provide for a release coating for the cake body.

If the cake preform is to be stored for any substantial period of time prior to its use, it is desirable to provide a moisture barrier 17 between the cake body 13 and the icing layer 14. The latter layer being highly hygroscopic and the cake body containing moisture, unless such a barrier were provided, after a period of time a wet interface layer would develop at the surface of the icing layer 14 immediately adjacent the cake body 13. Therefore, the moisture barrier 17 is interposed to prevent the migration of moisture from the cake body 13 to the icing layer 14. A blend of approximately two parts of sugar and one part of cake shortening has been found to provide an effective barrier composition which may be applied either to the surface of the layer of icing 14 or to the top crust of the cake body 13 which upon being inverted in the preform, faces the icing layer. Preferably, the barrier composition is spread, brushed, or sprayed upon the top crust of the cake body 13.

In assembling the packaged product for shipment, a release coating 16 is generally first applied to the inner surface of the cake pan 11. The icing layer 14 is then inserted into the bottom of the cake pan, preferably in a warm, fluid state so that it spreads somewhat to form an icing layer covering the bottom of the pan. The pre-baked and cooled cake body 13, the top crust of which has been previously coated with a sugar-shortening moisture barrier composition 17, is then placed in the pan in an inverted manner so that the top crust of the cake body 13 is adjacent the icing layer on the bottom of the cake pan. When this has been done the lid 12 is placed over the bottom of the cake body 13 and the sides of the cake pan are then crimped into position by pressing the crimped sides down over the cover as at 15. The cake preform product thus assembled as a packaged product is ready for the market.

To make a finished iced, oven-fresh cake from the cake preform, the entire package is placed in a moderate oven, for example, 250° F. for approximately a ten minute period. The release coating 16 and the icing layer 14 have compositions pre-selected with regard to their consistencies when warmed, and the effect of the moderate warming is to liquify the release coating 16 and soften the icing layer 14 so that when the lid 12 is removable from the pan by uncrimping the sides of the cake pan 11 and the cake pan inverted, the entire contents of the cake pan are readily released so that the pan may be easily removed leaving the oven-fresh cake with a layer of soft icing thereon exposed upon the lid serving dish 12. With a few strokes of a spatula, the icing layer 14 may be spread downwardly to cover the sides of the cake as shown in FIG. 3 or otherwise finished as desired. The cake is then ready to be transferred to a serving plate to be served in its oven-fresh condition.

From the above detailed description it is deemed that a bakery product and method of making the same are clearly set forth and all of the various advantages of the product are readily appreciated. The freshable qualities of the cake body permit the cake upon warming to be oven freshened and the warming of the icing layer permits it to be manipulated to form various decorations all of which present an oven-fresh cake ready to be served with a minimum of preparation on the part of the consumer.

Invention is claimed as follows:

1. A bakery product which comprises a cake pan, a cake preform in said cake pan, and a lid on and closing said pan, said preform comprising a pre-baked cake body and a layer of icing arranged between said cake body and the bottom of said pan.

2. A bakery product comprising a cake pan, an icing layer in the bottom of said cake pan, a pre-baked cake body in said cake pan above said icing layer, and a lid on and closing said cake pan.

3. The bakery product of claim 2 in which the cake body is inverted.

4. A bakery product which comprises a cake pan, a cake preform in said cake pan, said preform comprising a pre-baked cake body and a layer of icing arranged between said cake body and the bottom of said pan, release means arranged between said layer of icing and said pan for promoting removal of said preform from said pan, and a lid on and closing said pan.

5. A bakery product which comprises a cake pan, a release coating at least partially covering the inner surface of said cake pan, an icing layer in said coated cake pan, a pre-baked cake body in said cake pan above said icing layer, and a cake pan lid on and closing said cake pan.

6. A bakery product which comprises a cake pan, a release coating at least partially covering the inner surface of said pan, an icing layer in said coated cake pan, a pre-baked cake body in said cake pan, above said icing layer, a moisture barrier between said icing layer and said cake form, and a lid on and closing said cake pan.

7. The method of making a bakery product comprising the steps of preparing a cake pan, inserting an icing layer into said cake pan, placing a pre-baked cake body upon said icing layer in said cake pan and securing a cake pan lid over said cake body to close said pan.

8. The method of making a bakery product comprising the steps of applying a release coating to at least the bottom of the inner surface of a cake pan, inserting an icing layer into said cake pan upon said coating, placing a pre-baked cake body upon said icing layer, securing a cake pan lid over said cake body, and crimping and flattening the sides of said cake pan onto said lid.

9. The method of preparing an oven-fresh bakery product comprising the steps of applying a release coating to at least the bottom of the inner surface of a cake pan, inserting an icing layer into said cake pan upon said coating, placing a pre-baked cake body upon said icing layer, securing a cake pan lid over said body, crimping and flattening the sides of said cake pan onto said lid, warming said cake pan and the contents thereof, removing the lid from the cake pan and inverting and removing said cake pan from the contents thereof leaving an oven-fresh bakery product.

10. The method of claim 9 in which the bakery product is warmed in an oven at moderate heat for about 10 minutes.

11. The method of claim 9 in which the icing layer is spread over the bakery product in a decorative manner.

12. The method of preparing an oven-fresh bakery product comprising the steps of applying a release coating to at least the bottom of the inner surface of a cake pan, inserting an icing layer into said cake pan upon said coating, spreading a moisture barrier upon said icing layer, placing a pre-baked cake body upon said moisture barrier, securing a cake pan lid over said cake body, crimping and flattening the sides of said cake pan onto said lid, warming said cake pan and the contents thereof, uncrimping the sides of the cake pan from the lid, and inverting and removing the cake pan from the oven-fresh bakery product.

13. The method of preparing an oven-fresh bakery product comprising the steps of applying a release coating to at least the bottom of the inner surface of a cake pan, inserting an icing layer into said cake pan upon said coating, spreading a moisture barrier upon the top crust of pre-baked cake body, inverting said cake body and placing it into the cake pan upon said icing layer, so that the moisture barrier is between the cake body and the icing layer, securing a cake pan lid over said cake body on said cake pan, crimping and flattening the sides of said cake pan onto said lid, warming said cake pan and the contents thereof in an oven at moderate heat, removing the cake pan and its contents from the oven, uncrimping and raising the cake pan sides from the lid, and inverting and removing the cake pan from the oven-fresh bakery product.

References Cited in the file of this patent
UNITED STATES PATENTS

| | | |
|---|---|---|
| 2,167,353 | Frediani | July 25, 1939 |
| 2,220,971 | MacManus | Nov. 12, 1940 |
| 2,271,921 | Luker | Feb. 3, 1942 |
| 2,845,356 | Battiste | July 29, 1958 |